US006681876B1

(12) United States Patent
Haneda et al.

(10) Patent No.: US 6,681,876 B1

(45) **Date of Patent: *Jan. 27, 2004**

(54) RADIATOR CORE SUPPORT STRUCTURE OF MOTOR VEHICLE

(75) Inventors: Satoshi Haneda, Kanagawa (JP); Hideki Kobayashi, Kanagawa (JP)

(73) Assignee: Calsonic Kansei Corporation, Tokyo (JP)

(*) Notice: Subject to any disclaimer, the term of this patent is extended or adjusted under 35 U.S.C. 154(b) by 70 days.

This patent is subject to a terminal disclaimer.

(21) Appl. No.: 09/995,811

(22) Filed: Nov. 29, 2001

(30) Foreign Application Priority Data

Nov. 29, 2000 (JP) ....................................... 2000-363406
Nov. 29, 2000 (JP) ....................................... 2000-363448
Nov. 29, 2000 (JP) ....................................... 2000-363457

(51) Int. Cl.[7] ................................................ B60K 11/04

(52) U.S. Cl. ....................................... 180/68.4; 296/194

(58) Field of Search .............................. 180/68.4, 68.6, 180/299, 311; 280/781, 785; 296/194, 196, 197, 193, 203.01, 203.02

(56) References Cited

U.S. PATENT DOCUMENTS 4,141,426 A * 2/1979 Hamada et al. ............ 180/68.4
4,940,281 A * 7/1990 Komatsu .................... 296/194
5,123,695 A * 6/1992 Kanemitsu et al. ......... 296/194
5,348,114 A * 9/1994 Yamauchi ................... 180/291
5,409,288 A 4/1995 Masuda
5,573,299 A * 11/1996 Masuda ...................... 296/194
5,575,526 A * 11/1996 Wycech ...................... 296/205
5,667,004 A * 9/1997 Kroetsch ..................... 165/41
6,168,226 B1 * 1/2001 Wycech ................... 296/146.6
6,170,906 B1 * 1/2001 Kasuga .................. 296/203.02
6,189,958 B1 * 2/2001 Guyomard et al. ......... 296/194
6,196,624 B1 * 3/2001 Bierjon et al. ......... 296/203.02
6,216,810 B1 * 4/2001 Nakai et al. ............... 180/68.4
6,227,321 B1 * 5/2001 Frascaroli et al. ......... 180/68.4
6,273,496 B1 * 8/2001 Guyomard et al. ......... 296/194
6,386,624 B1 * 5/2002 Schultz et al. .............. 296/194
6,412,855 B1 * 7/2002 Cantineau et al. .......... 296/194
6,464,289 B2 * 10/2002 Sigonneau et al. ......... 296/194
6,502,653 B1 * 1/2003 Balzer et al. .............. 180/68.4
6,540,284 B2 * 4/2003 Miyata .................... 296/203.2
6,543,525 B2 * 4/2003 Kalbacher ................... 165/140
2002/0070062 A1 * 6/2002 Joutaki et al. ............. 180/68.4
2002/0084122 A1 * 7/2002 Emori et al. ............... 180/68.4

FOREIGN PATENT DOCUMENTS

| | | |
|---|---|---|
| JP | 5-85407 A | 4/1993 |
| JP | 5-105115 | 4/1993 |
| JP | 8-258742 A | 10/1996 |
| JP | 9-226625 A | 9/1997 |
| JP | 10-264855 | 10/1998 |

* cited by examiner

*Primary Examiner*—Brian L. Johnson
*Assistant Examiner*—J. Allen Shriver
(74) *Attorney, Agent, or Firm*—Foley & Lardner

(57) ABSTRACT

A radiator core support structure is a member to be mounted on a front portion of a vehicle body for supporting a radiator. The radiator core support structure comprises an upper elongate member made of metal, a lower elongate member made of metal and a hood lock stay portion made of molded plastic. The hood lock stay portion has an upper end integrally connected to the upper elongate member and a lower end that is shaped to grip an intermediate portion of the lower elongate member. The connection between the hood lock stay portion and each of the upper and lower elongate members is integrally carried out by injection molding.

33 Claims, 13 Drawing Sheets

2
12
11
10
12
11
10
E
20
13
35
16
19
35
15
14
19
17
17
20
1

1
3
4
4
5
5
6
7
8
9
13
14
15
16
17
17
19
19
20
20
35
35

13
17
16
14
17

1
17
34a
6b
6b
6
6a
6b
36a
36
36a
19
6
29
32a
32
6a
35
33
33a
14
15
25
28

RADIATOR CORE SUPPORT STRUCTURE OF MOTOR VEHICLE

CORRESPONDING RELATED APPLICATIONS

This application claims the benefit of and priority to Japanese Patent Applications 2000-363448 (filed Nov. 29, 2000), 2000-363406 (filed Nov. 29, 2000) and 2000-363457 (filed Nov. 29, 2000).

BACKGROUND OF THE INVENTION

1. Field of the Invention

The present invention relates to a radiator core support structure of a motor vehicle, which is mounted to a front portion of the vehicle body to support a radiator and the like.

2. Description of the Related Art

Hitherto, various types of radiator core support structures or motor vehicles have been proposed and put into practical use. Usually, the radiator core support structures have a basic structure which comprises radiator core support upper and lower members (which will be referred to as "upper and lower elongate members" for ease of description) which extend laterally with respect to a vehicle body and a hood lock stay member which extends vertically between intermediate portions of the upper and lower elongate members. These three members of the basic structure are made of metal and welded to one another to constitute a constructional base of the radiator core support structure. However, welding the hood lock stay member to both the upper and lower elongate members tends to induce deformation and/or distortion of the product (viz., radiator core support structure) due to the very high heat used for the welding. As is known, if the radiator core support structure produced has a poor dimensional stability due to such deformation and/or distortion, mounting the support structure to a vehicle body needs a difficult or at least time-consumed mounting work.

In order to solve the above-mentioned drawback, various measures have been also proposed. One of them is to produce a part or parts of the radiator core support structure by molded plastics. The support structure of this type is called "hybrid type". Due to the nature of plastics used therein, this hybrid type radiator core support structure is able to exhibit a satisfied dimensional stability. That is, due to usage of the plastic parts through which metal parts are connected, deformation and/or distortion of the support structure is minimized.

However, usage of such plastic parts brings about such a new drawback that the radiator core support structure of the hybrid type fails to have a satisfied mechanical strength. As is known, the radiator core support structure has an upper portion to which a hood lock device for an engine hood is mounted. Thus, when the core support structure is constructed to have a poor mechanical strength, it can not bear a marked shock that is produced when the engine hood is strongly pivoted down to assume a closed position. This drawback becomes much severe when an associated motor vehicle is subjected to a vehicle is collision, particularly, a head-on collision. That is, upon such vehicle collision, the locked engagement between the hood lock device and the hood is easily broken due to the insufficient mechanical strength of the radiator core support structure.

SUMMARY OF THE INVENTION

It is therefore an object of the present invention to provide a radiator core support structure of a motor vehicle, which is free of the above-mentioned drawbacks.

According to the present invention, there is provided a radiator core support structure which has a satisfied mechanical strength even though it is of a hybrid type.

According to the present invention, there is further provided a radiator core support structure which comprises upper and lower elongate members of metal, a hood lock stay portion of molded plastic extending between intermediate portions of the upper and lower elongate members, and a grip portion defined by a lower end of the hood lock stay portion, the grip portion tightly gripping the intermediate portion of the lower elongate member.

According to the present invention, there is further provided a radiator core support structure of a hybrid type, which has a bracket arrangement through which a radiator is reliably held by the radiator core support structure.

According to the present invention, there is still further provided a radiator core support structure of a hybrid type, which has a tube holder arrangement by which an oil tube extending from a power steering unit is reliably held.

According to a first aspect of the present invention, there is provided a radiator core support structure which comprises an upper elongate member; a lower elongate member made of metal; and a hood lock stay portion made of integrally molded plastic, the hood lock stay portion having an upper end integrally connected to the upper elongate member and a lower end that is integrally connected to and shaped to grip an intermediate portion of the lower elongate member, the connection between the hood lock stay portion and the lower elongate member being integrally carried out by injection molding.

According to a second aspect of the present invention, there is provided a radiator core support structure which comprises an upper elongate member made of metal; a hood lock mounting member made of metal, the hood lock mounting member being welded to an intermediate portion of the upper elongate member; a lower elongate member made of metal; two side members made of metal, the side members being welded to laterally opposed ends of the lower elongate member; a hood lock stay portion made of a molded plastic, the hood lock stay portion having an upper end integrally connected to the hood lock mounting member and a lower end integrally connected to an intermediate portion of the lower elongate member; two pillar portions made of molded plastic, each pillar portion extending between laterally outside portions of the upper and lower elongate members; an upper reinforcing structure made of molded plastic, the upper reinforcing structure extending in a channel defined in the upper elongate member and integrally connected with the upper end of the hood lock stay portion as well as the upper ends of the two pillar portions; and a lower reinforcing structure made of molded plastic, the lower reinforcing structure extending in a channel defined in the lower elongate member and integrally connected with the lower end of the hood lock stay portion as well as the lower ends of the two pillar portions wherein the lower end of said hood lock stay portion is shaped to grip the intermediate portion of the lower elongate member.

According to a third aspect of the present invention, there is provided a radiator core support structure which comprises an upper elongate member made of metal; a hood lock mounting member made of metal, the hood lock mounting member being welded to an intermediate portion of the upper elongate member; a lower elongate member made of metal; two side members made of metal, the side members being welded to laterally opposed ends of the lower elongate member; a hood lock stay portion made of a molded plastic, the hood lock stay portion having an upper end integrally connected to the hood lock mounting member and a lower end integrally connected to an intermediate portion of the lower elongate member; two pillar portions made of molded plastic, each pillar portion extending between laterally outside portions of the upper and lower elongate members; an upper reinforcing structure made of molded plastic, the upper reinforcing structure extending in a channel defined in the upper elongate member and integrally connected with the upper end of the hood lock stay portion as well as the upper ends of the two pillar portions; a lower reinforcing structure made of molded plastic, the lower reinforcing structure extending in a channel defined in the lower elongate member and integrally connected with the lower end of the hood lock stay portion as well as the lower ends of the two pillar portions; mutually spaced two lower brackets which are integral with the lower reinforcing structure and exposed to a back side of the lower elongate member; and mutually spaced two upper brackets made of metal, the upper brackets being secured to the upper elongate member and exposed to a back side of the upper elongate member, wherein the lower and upper brackets are arranged to support and hold a radiator.

According to fourth aspect of the present invention, there is provided a radiator core support structure which comprises an upper elongate member made of metal; a hood lock mounting member made of metal, the hood lock mounting member being welded to an intermediate portion of the upper elongate member; a lower elongate member made of metal; two side members made of metal, the side members being welded to laterally opposed ends of the lower elongate member; a hood lock stay portion made of a molded plastic, the hood lock stay portion having an upper end integrally connected to the hood lock mounting member and a lower end integrally connected to an intermediate portion of the lower elongate member; two pillar portions made of molded plastic, each pillar portion extending between laterally outside portions of the upper and lower elongate members; an upper reinforcing structure made of molded plastic, the upper reinforcing structure extending in a channel defined in the upper elongate member and integrally connected with the upper end of the hood lock stay portion as well as the upper ends of the two pillar portions; a lower reinforcing structure made of molded plastic, the lower reinforcing structure extending in a channel defined in the lower elongate member and integrally connected with the lower end of the hood lock stay portion as well as the lower ends of the two pillar portions; first and second bracket which are integral with the lower reinforcing structure and raised from the lower elongate member, each bracket including two holding pawls by which an oil tube from a power steering unit is detachably held; a third bracket integral with one of the pillar portions, the third bracket including two holding pawls by which the oil tube is detachably held; and a vertically extending groove defined by the pillar portion, the groove steadily receiving therein a part of said oil tube.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a radiator core support structure of the present invention will be described in detail with reference to the accompanying drawings.

For ease of understanding, various directional terms, such as, upper, lower, right, left, upward, downward, etc., are used in the description. However, such terms are to be understood with respect to only a drawing or drawings on which the corresponding part or parts are illustrated.

Figure 1:
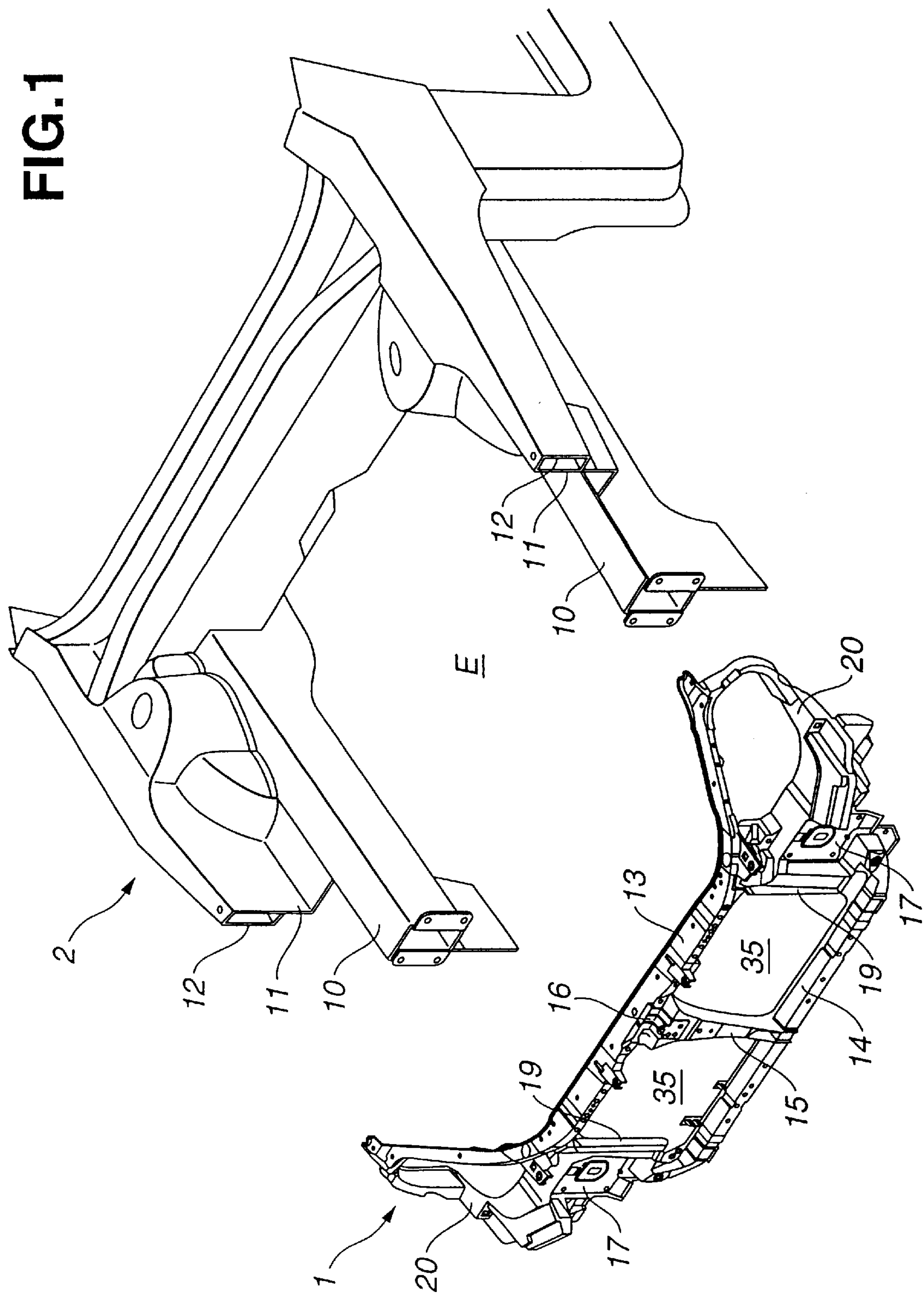
FIG. 1 is a perspective view of a radiator core support structure of the present invention and a front structure of a motor vehicle to which the radiator core support structure is to be mounted.
Figure 2:
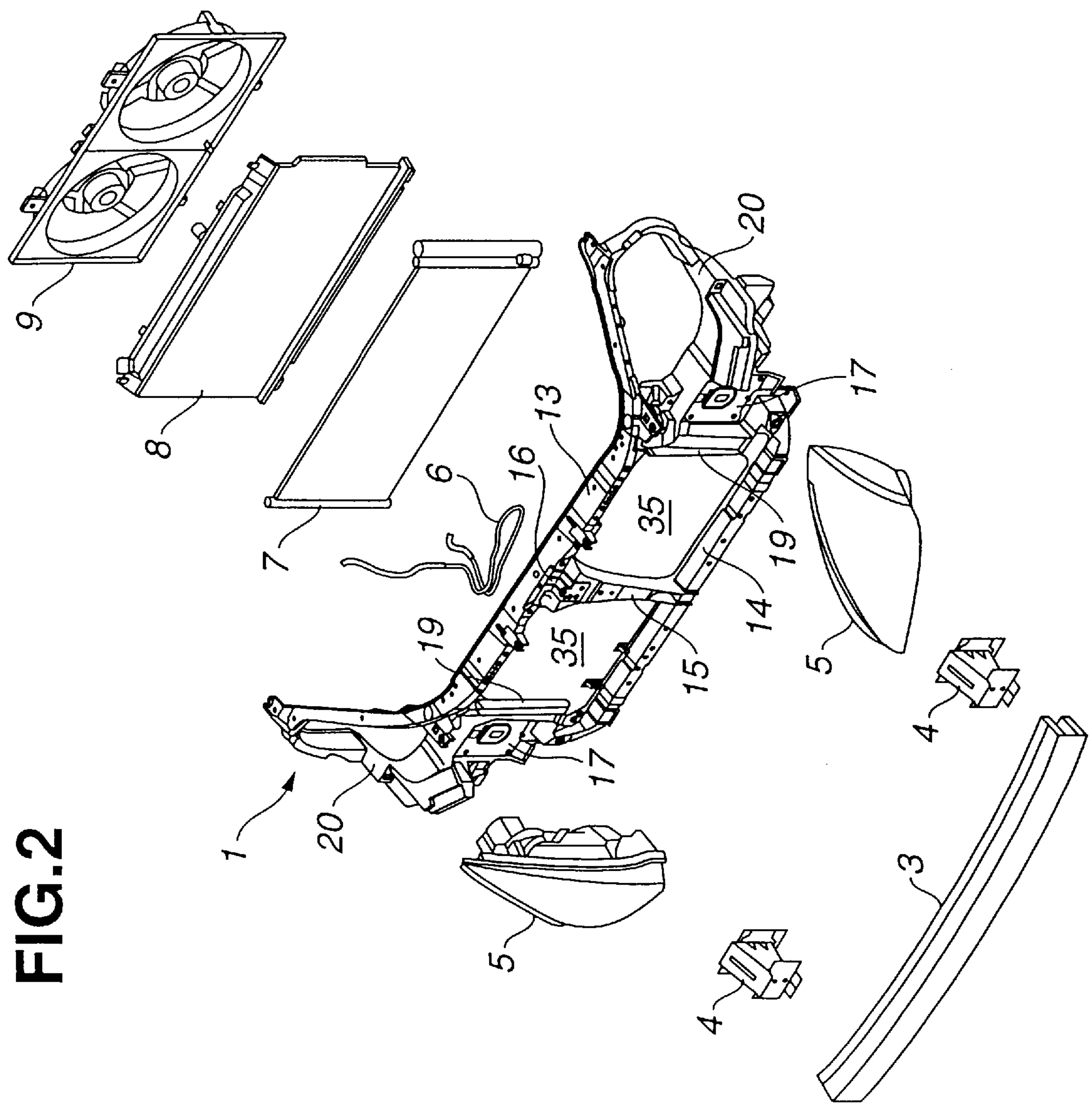
FIG. 2 is a perspective view of the radiator core support structure of the present invention and other parts which are mounted to the radiator core support structure form a module.

In FIGS. 1 and 2, denoted by numeral 1 is a radiator core support structure according to the present invention, and denoted by numeral 2 is a front structure of a motor vehicle body.

As is seen from FIG. 2, before the radiator core support structure 1 is mounted to the front structure 2, the structure 1 is assembled with a bumper armature 3, bumper stays 4, lamps 5, an oil tube 6 of a power-steering unit, a condenser 7, a radiator 8 and a fan shroud 9 to constitute a module. That is, the module carrying such various parts is mounted to the front structure 2 at a time, which facilitates the parts-mounting work required by an assembler.

As is seen from FIG. 1, the front structure 2 of the vehicle body is constructed to constitute an engine room "E" and comprises two forwardly extending front side members 10.

Each side member 10 has an enclosed rectangular cross section. On and along an outside portion of each side member 10, there extends a hood ridge panel 11, and on and along an outside portion of the hood ridge panel 11, there extends a hood ridge reinforcing member 12. As shown, the hood ridge panel 11 and the hood ridge reinforcing member 12 are united via welding to constitute a boxy structure having an enclosed cross section.

Figure 3:
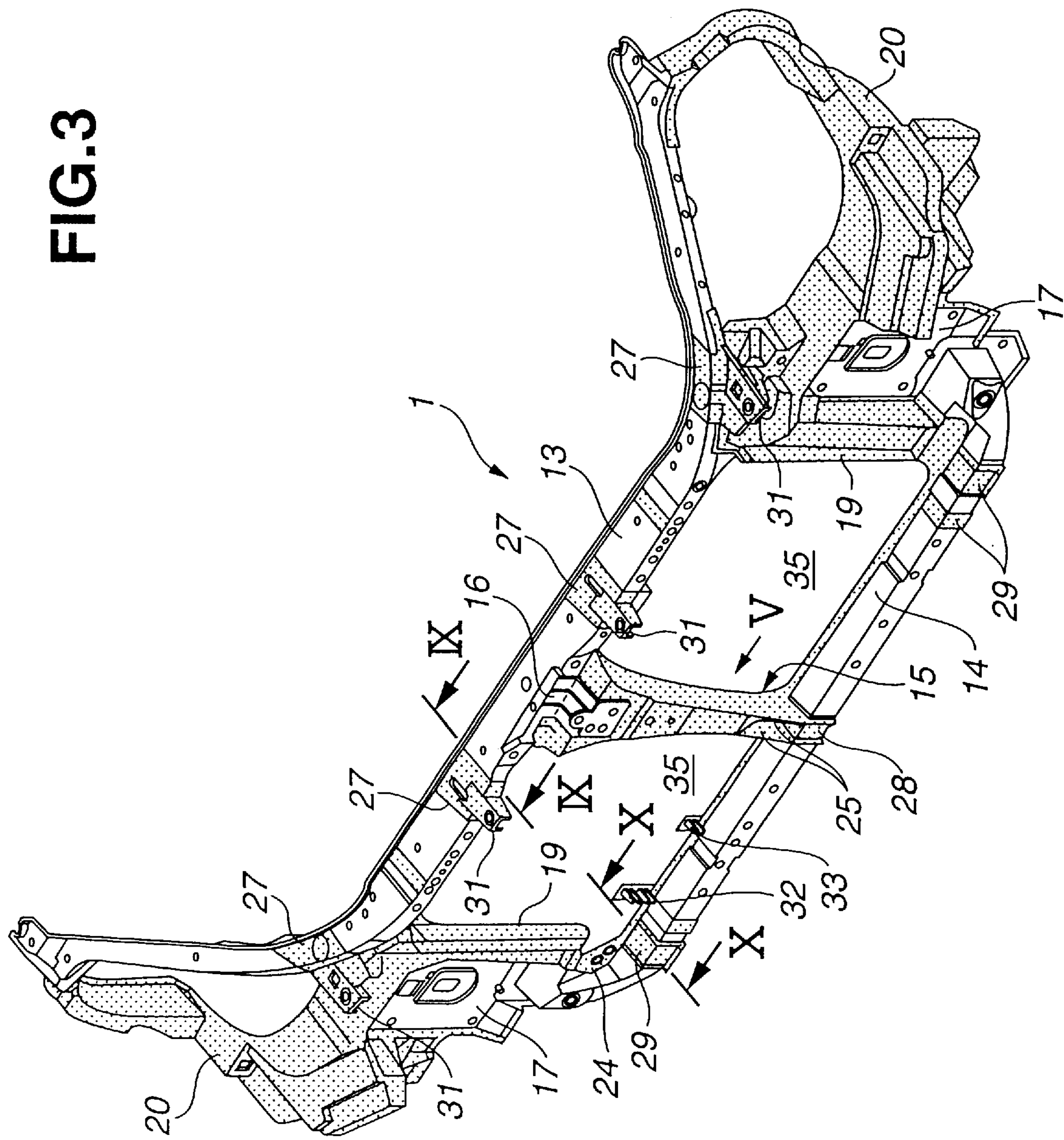
FIG. 3 is a perspective of the radiator core support structure of the present invention, showing portions illustrated by half-tone dot meshing, which are made of integrally molded plastic.

As is best seen from FIG. 3, the radiator core support structure 1 according to the present invention comprises parts made of metal and parts made of integrally molded plastic. In the drawing, the metal-made parts are illustrated by shaped blank and plastic-made parts are illustrated by half-tone dot meshing.

The radiator core support structure 1 has a basic structure which generally comprises radiator core support upper and lower members 13 and 14 (which will be referred to as "upper and lower elongate members" for ease of description) which extend laterally with respect to the vehicle body and a hood lock stay portion 15 which extends vertically between intermediate portions of the upper and lower elongate members 13 and 14.

Figure 4:
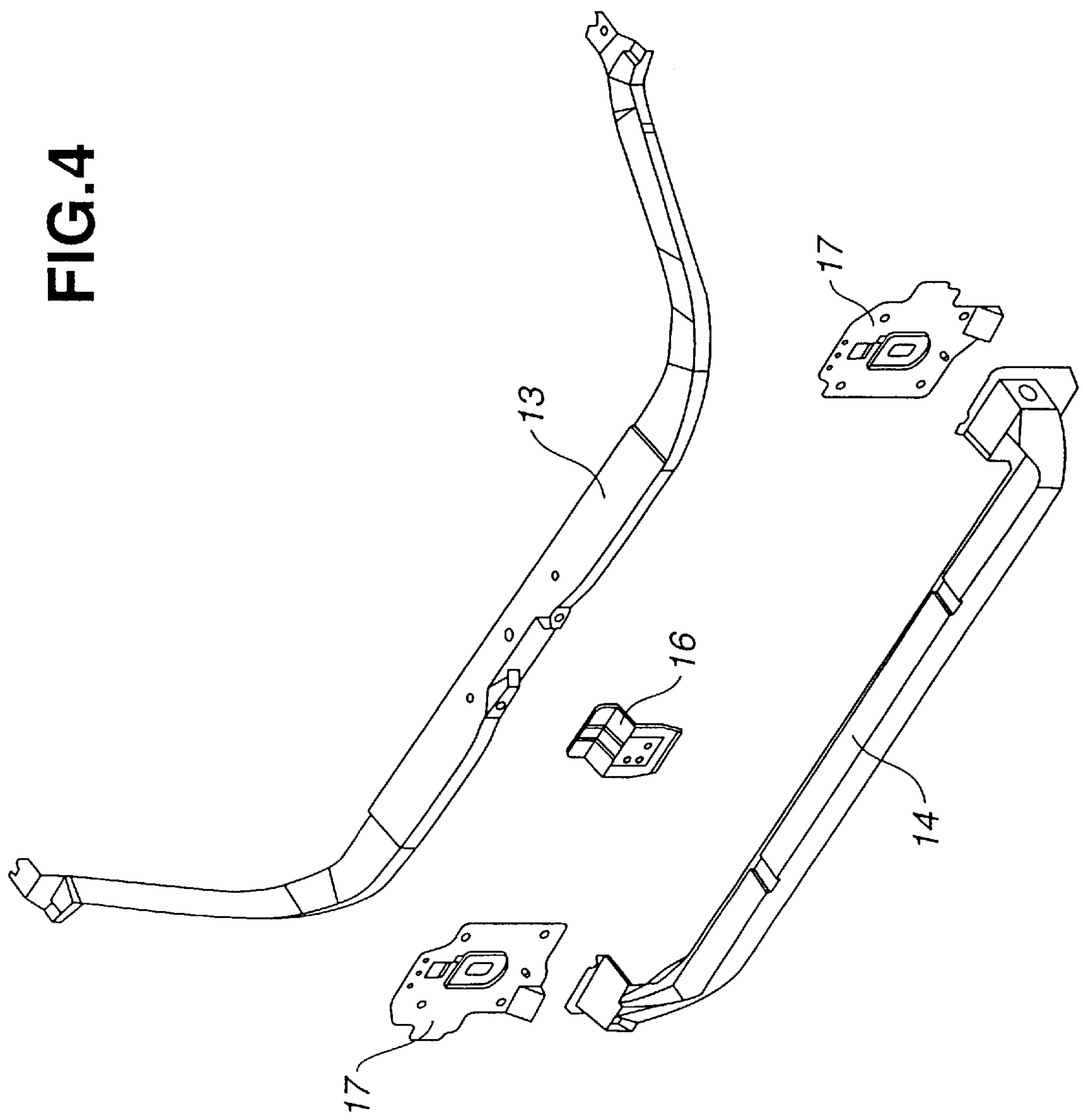
FIG. 4 is a perspective view of some parts of the radiator core support structure of the present invention, which are made of metal.

FIG. 4 shows only the parts made of metal, which are the upper and lower elongate members 13 and 14, a hood lock mounting member 16 which is welded to an intermediate portion of the upper elongate member 13, and two side members 17 which are welded to lateral ends of the lower elongate member 14. If desired, the hood lock mounting member 16 may be integral with the upper elongate member 13, and the side members 17 may be integral with the lower elongate member 14.

Figure 9:
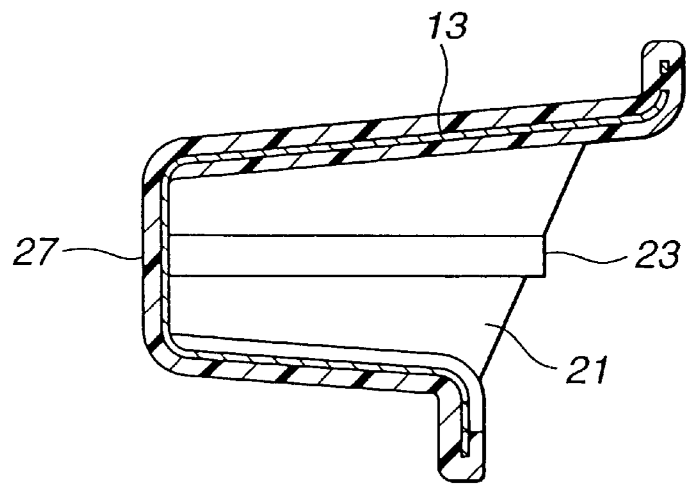
FIG. 9 is an enlarged sectional view taken along the line "IX—IX" of FIG. 3, showing an upper elongate member.
Figure 10:
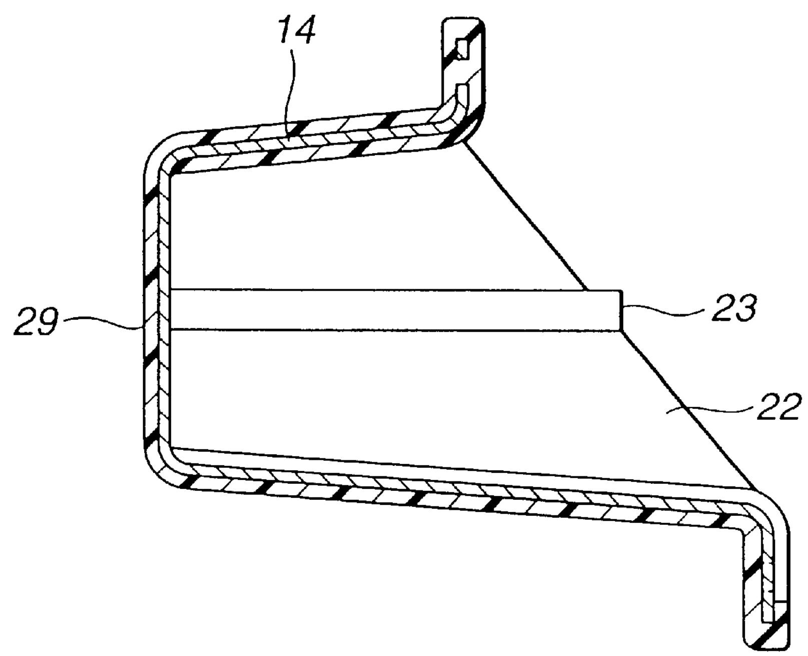
FIG. 10 is an enlarged sectional view taken along the line "X—X" of FIG. 3, showing the lower elongate member.

As will be seen from FIGS. 9 and 10, the upper and lower elongate members 13 and 14 are of a channel member having a generally hat-shaped cross section. As is seen from FIG. 1, upon mounting on the front structure 2 of the vehicle body, the upper and lower elongate members 13 and 14 are orientated so that entrances of the channels face rearward, that is, toward the front structure 2 of the vehicle body.

In order to produce the radiator core support structure 1 of the present invention, the following plastic molding process is carried out.

Figure 11:
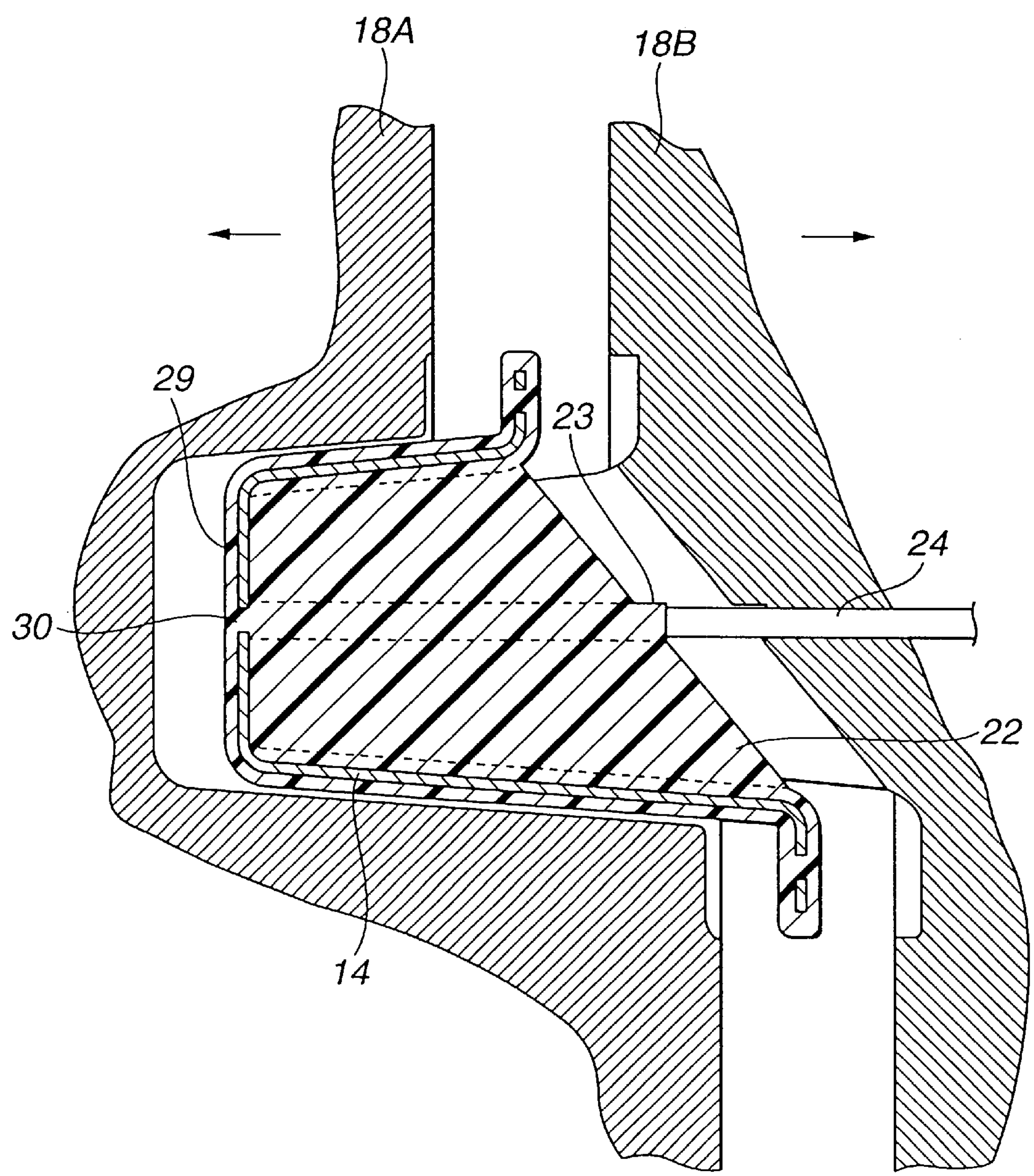
FIG. 11 is an sectional view of the lower elongate member in a condition wherein the radiator support lower member is being removed from a mold assembly with the aid of ejector pins.

That is, as is understood from FIG. 11, a mold assembly is prepared which generally comprises first and second molding dies 18A and 18B which are movable to have an open position wherein as shown in the drawing the first and second molding dies 18A and 18B are separated and a closed position wherein the first and second molding dies 18A and 18B are tightly coupled leaving therebetween a cavity having a predeterined shape corresponding to the shape of the product, viz., the radiator core support structure 1. That is, at first, the mold assembly is forced to assume the open position, and the above-mentioned metal parts, namely, the upper elongate member 13 having the hood lock mounting member 16 welded thereto and the lower elongate member 14 having the side members 17 welded thereto, are put into right positions of the cavity as inserts. For positioning the parts 13, 16, 14 and 17, a plurality of positioning pins (not shown) are provided in the molding dies 18A and 18B. Then, the two molding dies 18A and 18B are tightly coupled forcing the mold assembly to assume the closed position. Then, a so-called injection molding is carried out, so that a given amount of molten plastic material (viz., glass fiber mixed plastic material) is injected into given positions of the cavity. After the injected plastic material in the cavity becomes to have a certain hardness, the two molding dies 18A and 18B are released as shown in FIG. 11, and the product, that is, the radiator core support structure 1 shown in FIG. 3, is removed from the released mold assembly.

As is seen from FIG. 3, by this injection molding, the hood lock stay portion 15, two pillar portions 19, two lamp mounting portions 20 and after-mentioning reinforcing structures associated with the upper and lower elongate members 13 and 14 are produced at the same time. The hood lock stay portion 15 has an upper end integrated with the hood lock mounting member 16 and a lower end integrally connected to the middle portion of the lower elongate member 14 through an after-mentioned grip portion 28. Each pillar portion 19 is integrated with the corresponding side member 17, and each lamp mounting portion 20 is integrated with both the corresponding side member 17 and upper elongate member 13. Each lamp mounting portion 20 has a complicated three-dimensional structure.

As shown in FIGS. 1, 2 and 3, the radiator core support structure 1 thus produced has two radiator openings 35, each being positioned between the hood lock stay portion 15 and the corresponding pillar portion 19.

Figure 5:
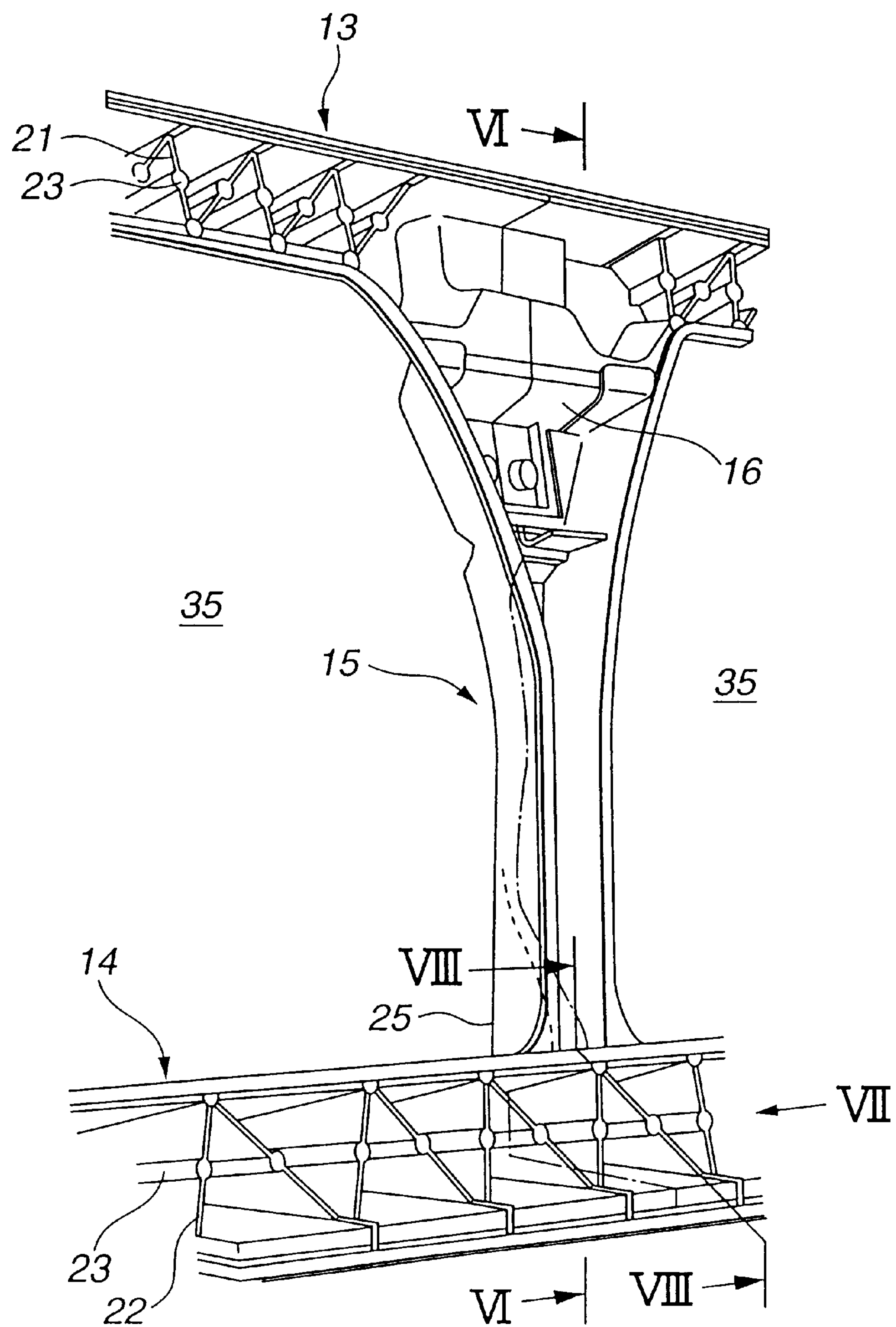
FIG. 5 is an enlarged back view of a portion of the radiator core support structure taken from the arrow "V" of FIG. 3, showing a rear view of a hood lock stay portion and its neighboring portions.

As is seen from FIG. 5, by the injection molding, reinforcing structures of the plastic are respectively provided in the channels defined by the upper and lower elongate members 13 and 14. That is, the reinforcing structure in the upper or lower elongate member 13 or 14 comprises a plurality of slanted ribs 21 or 22 which extend in a so-called zigzag manner in and along the channel of the upper or lower elongate member 13 or 14. As shown, the zigzag rib arrangement 21 or 22 extends from an upper or lower end portion of the hood lock stay portion 15 to a lateral end of the upper or lower elongate member 13 or 14.

It is to be noted that due to provision of such reinforcing structures of plastic integrally installed in the respective channels, the upper and lower elongate members 13 and 14 have an excellent mechanical strength.

Figure 7:
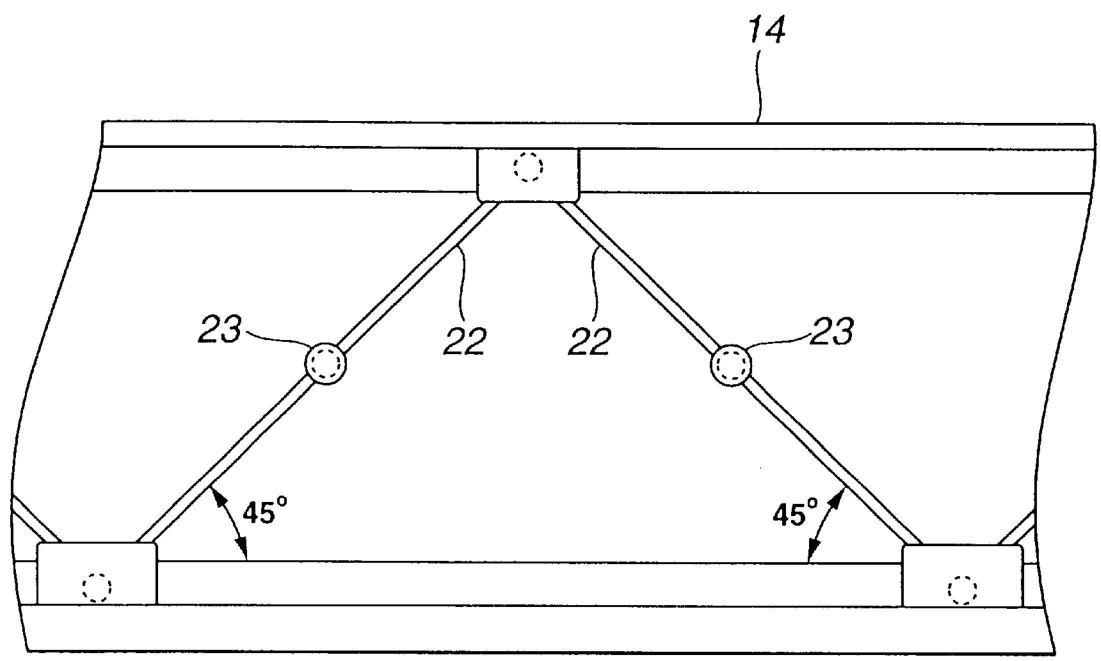
FIG. 7 is an enlarged view taken from the arrow "VII" of FIG. 5, showing zigzag arranged ribs of a lower elongate member.

As is seen from FIG. 7, preferably, each slanted rib 22 (or 21) is inclined about 45° relative to a longitudinal axis of the lower (or upper) elongate member 14 (or 13). In fact, the zigzag ribs 22 and 21 having such an inclined angle can exhibit an excellent performance in buckling strength and torsional rigidity.

Since the upper and lower elongate members 13 and 14 are connected through three portions, namely, the hood lock stay portion 15 and the two pillar portions 19, the rigidity of the radiator core support structure 1 against a tensile load applied thereto is increased. Furthermore, since each pillar portion 19 is integrated with the side member 17 welded to the lower elongate member 14, lateral portions of the radiator core support structure 1 near the pillar portions 19 exhibit an excellent torsional rigidity. Furthermore, since the lateral ends of the upper elongate member 13 and the side members 17 are connected through the lamp mounting portions 20 having the complicated three-dimensional structure, the torsional rigidity of entire construction of the radiator core support structure 1 is much increased.

Referring back to FIG. 5, each slanted rib 21 or 22 has a cylindrical portion 23 at a middle portion thereof. The diameter of the cylindrical portion 23 is larger than the thickness of the rib 21 or 22. As is seen from FIG. 11, a rear end of each cylindrical portion 23 has a flat surface and is projected slightly. The projected rear end of each cylindrical portion 23 thus has a high rigidity.

Due to provision of the cylindrical portions 23 of high rigidity, the product 1 (viz., radiator core support structure) can be easily removed from the released mold assembly. That is, upon mold releasing, for facilitating removal of the product 1 from the mold assembly, ejector pins 24 are pushed against the rear ends of the cylindrical portions 23. If the ejector pins 24 are pushed against other portions having a poor rigidity, such as, upper and lower edges of the lower or upper elongate member 14 or 13, it may occur that the zigzag ribs 22 or 21 are broken due to undesired expanding movement of the edges caused by the pushing force of the ejector pins 24. Furthermore, if the ejector pins 24 are pushed directly against the bottom wall of the channel of the upper or lower elongate member 13 or 14, it may occur that the bottom portion, that is made of metal, is deformed. Thus, pushing the projected rear ends of the cylindrical portions 23 by the ejector pins 24 should be made with care.

Figure 6:
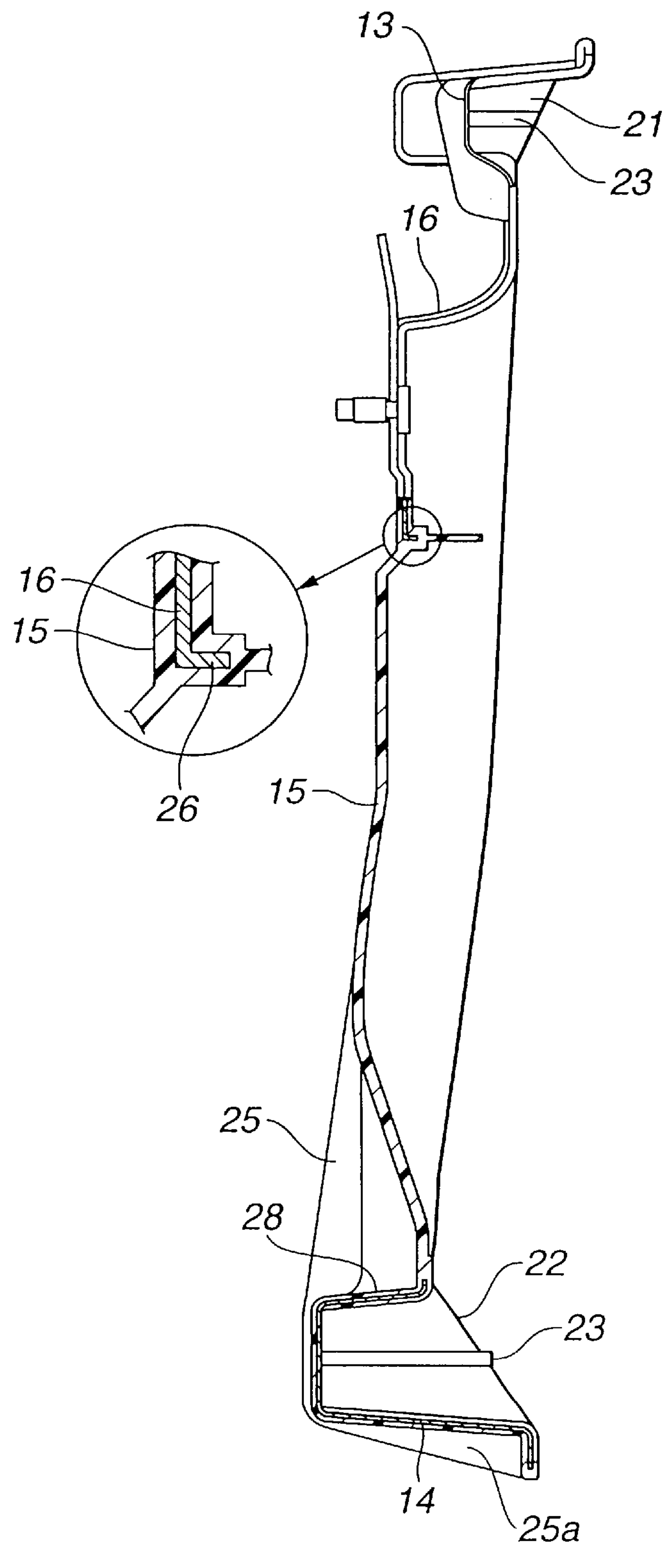
FIG. 6 is a sectional view take along the line "VI—VI" of FIG. 5.

As is seen from FIGS. 5 and 6, the hood lock stay portion is constructed to have a generally C-shaped cross section and so oriented that a channel thereof faces rearward, that is, toward the front structure 2 of the vehicle body. Due to this arrangement, each radiator opening 35 is allowed to smoothly receive cooling air for the condenser 7 and the radiator 8.

As is seen from FIGS. 3, 5 and 6, the hood lock stay portion 15 has a lower portion 28 which grips the intermediate portion of the lower elongate member 14. The lower portion 28 will be described in detail hereinafter.

Near the lower portion 28, the hood lock stay portion 15 has a depressed part whose bottom wall is bent rearward and connected with the upper edge of the lower elongate member 14. The depressed part is sandwiched between and reinforced by two vertical walls 25, each extending vertically. For forming the depressed part of the hood lock stay portion 15, a cavity surface of the mold assembly has a projection of a shape matched with the depressed part. With this arrangement, the plastic-molded parts provided ahead of the flange portions (viz., flanged portions of the hat-shape) of the lower elongate member 14 can have each a satisfied and uniform thickness.

Figure 8:
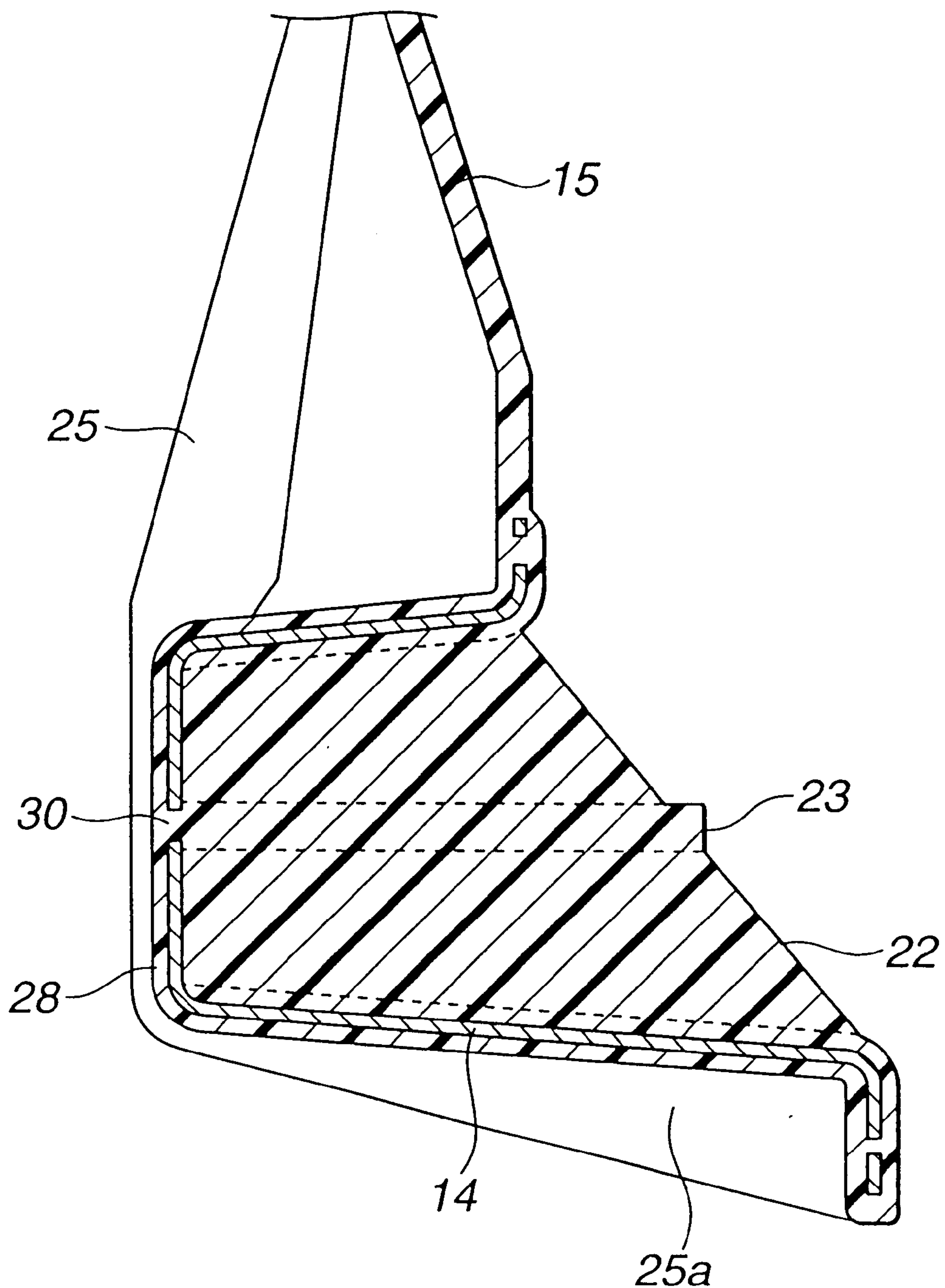
FIG. 8 is an enlarged sectional view taken along the line "VIII—VIII" of FIG. 5, showing the lower elongate member and its neighboring parts.

It is to be noted that as is seen from FIGS. 3, 6 and 8, each of the vertical walls 25 of the hood lock stay portion 15 has a grip portion 28 for tightly gripping the lower elongate member 14. More specifically, the grip portion 28 is shaped to wholly surround an intermediate portion of the lower elongate member 14. As is seen from FIG. 8, the grip portion 28 substantially consists of an upper flat portion which covers an upper wall of the lower elongate member 14, a front flat portion which covers a front wall of the member 14, a lower flat portion which covers a lower wall of the member 14 and a rear inclined portion which constitutes rear ends of a pair of zigzag ribs 22. That is, for gripping the intermediate portion of the lower elongate member 14, the grip portion 28 has a closed loop. Preferably, vertical extra ribs may be formed on the grip portion 28 to increase the mechanical strength of the same.

As is seen from FIGS. 3, 5 and 6, the hood lock stay portion 15 has an upper part which is connected to the hood lock mounting member 16 welded to the upper elongate member 13. Due to this arrangement, the rigidity or mechanical strength of the hood lock mounting member 16 is increased. Although not shown in the drawings, a hood lock device is mounted on the hood lock mounting member 16 and a striker is mounted on a front end of an engine hood. When the hood is pivoted down to assume a closed position, the hood lock device catches the striker to latch or lock the hood at the closed position. Due to the robust arrangement of the hood lock mounting member 16, the hood catching is assuredly carried out. If hood lock mounting member 16 fails to provide the hood lock device with a robust mounting base, undesired vibration of the hood tends to occur under running of the motor vehicle. In fact, robust construction of the hood lock mounting member 16 is needed particularly when an associated motor vehicle encounters a head-on collision. If such robust construction is not provided to the hood lock mounting member 16, the head-on collision easily breaks the locked engagement between the hood lock device and the hood due to a great tensile load applied therebetween, which fails to induce a so-called two-fold bending of the engine hood, increasing the possibility of dangerous rush of the bent hood into the passenger cabin. As is known, upon a vehicle head-on collision, having the engine hood instantly bent (viz., two-fold bending) is very advantageous in not only absorbing the collision shock but also avoiding the dangerous rush of the hood into the passenger cabin.

As is seen from FIG. 6, the hood lock mounting member 16 has a lower end 26 which is bent rearward and embedded in the hood lock stay portion 15. Due to this arrangement, a shock produced when the engine hood is bumped against the hood lock device is assuredly damped by the hood lock stay portion 15. Furthermore, due to such arrangement, the resistance of the hood lock mounting member 16 against the breakage of the locked engagement between the hood lock device and the hood is increased.

As is seen from FIGS. 3, 8, 9 and 10, by the injection molding, a plurality of grip portions 27, 28 and 29 of molded plastic are produced, which cover or grip parts of the upper and lower elongate members 13 and 14. It is to be noted that the grip plastic portions 27 are integral with the zigzag ribs 21 in the upper elongate member 13 and the other grip plastic portions 28 and 29 are integral with the zigzag ribs 22 in the lower elongate member 14. Due to provision of these grip plastic portions 27, 28 and 29, integrated connection between the metal made parts (viz., 13, 14, 16 and 17) and the plastic made portions (viz., 27, 28, 29, 15, 19, 20) is improved, which increases the mechanical strength of the entire construction of the radiator core support structure 1 of the invention.

As is seen from FIG. 8, the lower elongate member 14 is formed at the front and bottom walls of the hat-shaped channel thereof with a plurality of through holes 30 through which the plastic lying on the front surface of the lower elongate member 14 is integrally connected with the zigzag ribs 22 installed in the channel. Like this, the molded plastic lying on the front surface of the upper elongate member 13 is integrally connected with the zigzag ribs 21 in the channel of the upper elongate member 13. Due to this integral connection, the grip plastic portions 27, 28 and 29 are tightly secured or bonded to the upper or lower elongate member 13 or 14. In the illustrated embodiment, the through holes 30 are aligned with the cylindrical portions 23 of the zigzag ribs 22. This arrangement promotes the resistance of the hood lock stay portion 15 against the tensile load which would be applied thereto upon the vehicle head-on collision.

As is seen from FIG. 3, the grip plastic portions 27 lying on the upper elongate member 13 are formed with respective brackets 31 to which a front grill (not shown) of the vehicle is connected. One of the grip plastic portions 29 lying on the lower elongate member 14 is formed with a bracket 32. Beside the bracket 32, there is positioned a bracket 33 which is also integral with the zigzag ribs 22 in the lower elongate member 14. One of the pillar portions 19 is formed at its lower part with a bracket 34. These brackets 32, 33 and 34 are used for supporting or holding an oil tube extending from a power steering unit, and will be described in detail hereinafter, that is, in a part describing FIG. 14.

Figure 12:
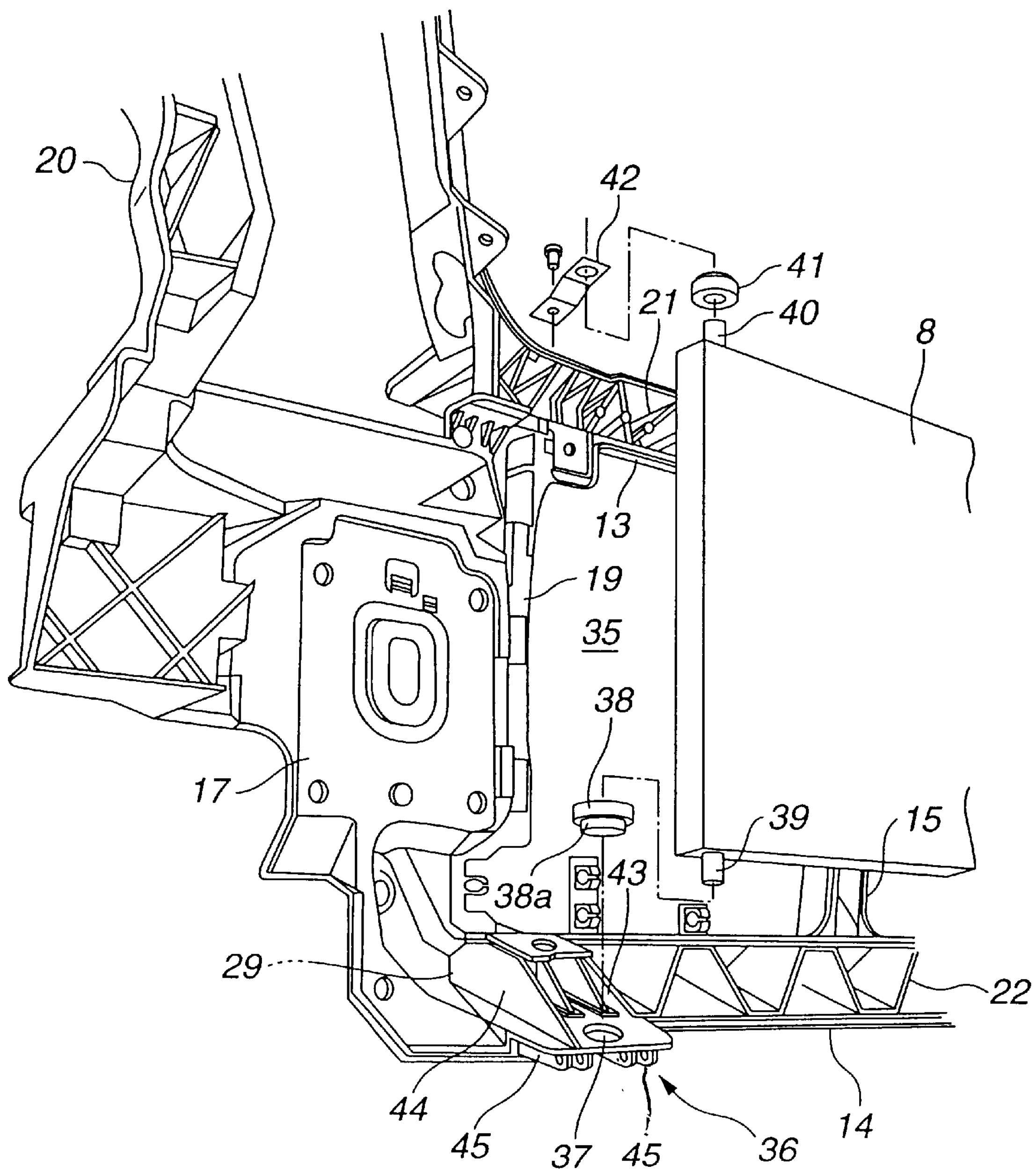
FIG. 12 is a perspective back view of a part of radiator core support structure, showing a bracket arrangement incorporated with the radiator core support structure for supporting a radiator.
Figure 13:
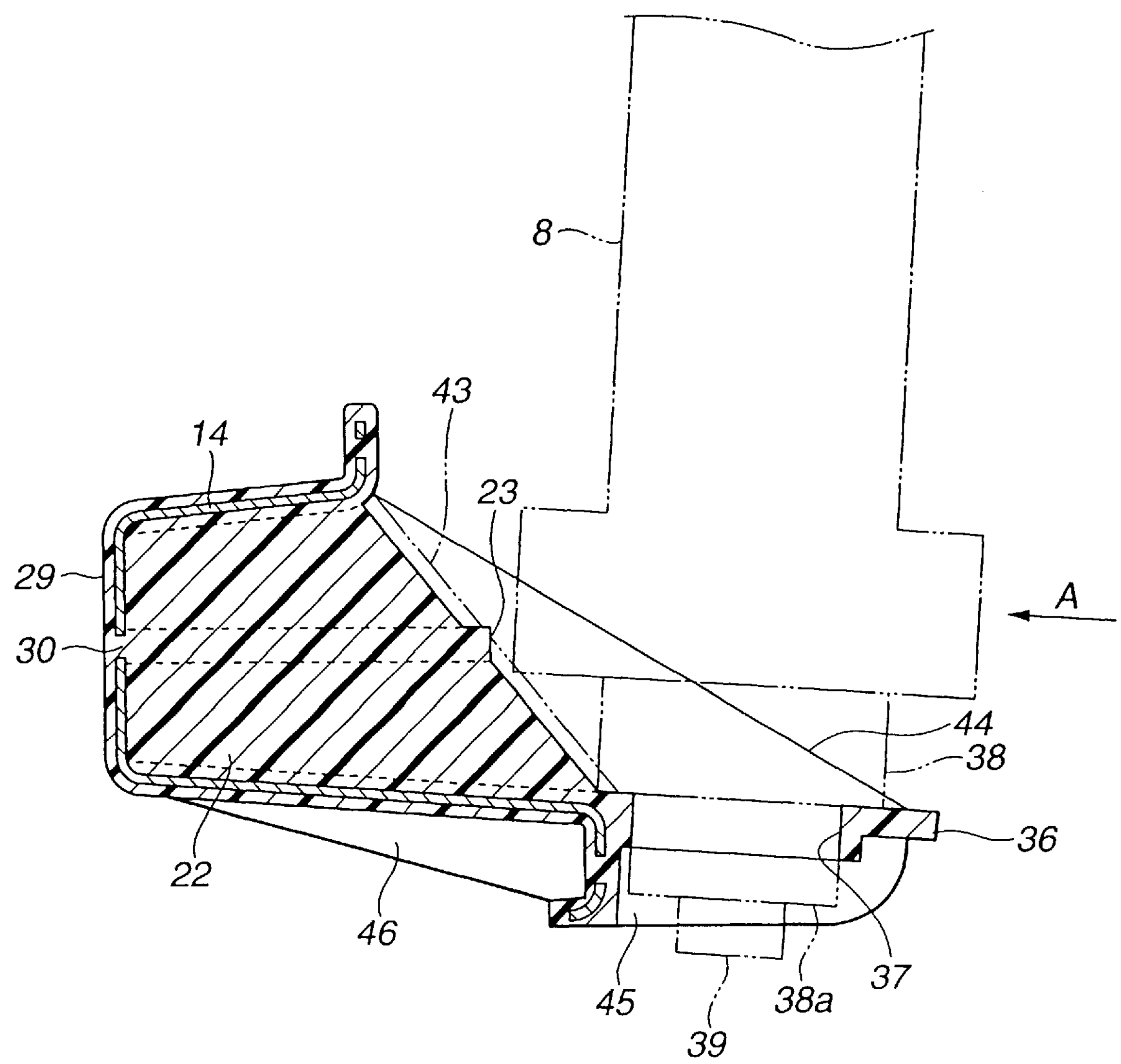
FIG. 13 is a sectional view of the lower elongate member at a position where a lower bracket of the bracket arrangement is provided.

Referring to FIGS. 12 and 13, particularly FIG. 12, there is shown a bracket arrangement through which the radiator 8 is held on a back side of the radiator core support structure 1.

As is seen from FIG. 12, the bracket arrangement comprises two lower brackets 36 (only one is shown) associated with the lower elongate member 14 and two upper brackets 42 (only one is shown) associated with the upper elongate member 13.

The two lower brackets 36 are integral with the zigzag ribs 22 running in the lower elongate member 14. That is, the lower brackets 36 are integral with and projected backward from the respective grip plastic portions 29 (see FIG. 3) and positioned at a back side of the lower elongate member 14. More specifically, as is understood from FIGS. 12 and 13, each lower bracket 36 is constructed to have a generally H-shape as viewed from the direction of the arrow "A" of FIG. 13, which exhibits an excellent mechanical strength or part holding performance.

That is, the lower bracket 36 comprises a horizontal flat base wall which has a circular opening 37, two triangular upper ribs 43 and 44 which extend upward from laterally opposed ends of the flat base wall, two lower ribs 45 which extend downward from the laterally opposed ends of the flat base wall and two front lower ribs 46 which extend forward from front ends of the lower ribs 45. As is seen from FIG. 13, the lower bracket 36 having the above-mentioned construction and the associated grip plastic portion 29 are integrated with each other and they are arranged to wrap the lower elongate member 14. The triangular inside upper rib 43 is so shaped and sized as not to interfere with the radiator 8 mounted on the flat base wall of the lower bracket 36. In order to mount or put the radiator 8 on the lower brackets 36, two cylindrical rubber mounts 38 are prepared, which have each a diametrically reduced part 38*a*. Each rubber mount 38 is received on a lower pin 39 projected downward from the radiator 8. Then, the rubber mount 38 is snugly put at the reduced part 38*a* into the circular opening 37 of the lower bracket 36.

If desired, as shown in FIG. 12, upper and lower extra ribs may be formed on and beneath the horizontal flat base wall of the lower bracket 36. That is, the upper extra ribs extend upward from the horizontal flat base wall between the two triangular upper ribs 43 and 44, and the lower extra ribs extend downward from the base wall between the two lower ribs 45. The lower bracket 36 can have a much robust construction.

Referring back to FIG. 12, each of the upper brackets 42 is made of metal and bolted to the upper elongate member 13. The upper bracket 42 has a circular opening. In order to connect the radiator 8 to the upper brackets 42, two cylindrical rubber mounts 41 are prepared, which are substantially the same as the above-mentioned rubber mounts 38. Each rubber mount 41 is received on an upper pin 40 projected upward from the radiator 8. Then, the rubber mount 41 is snugly put into the opening of the upper bracket 42.

Figure 14:
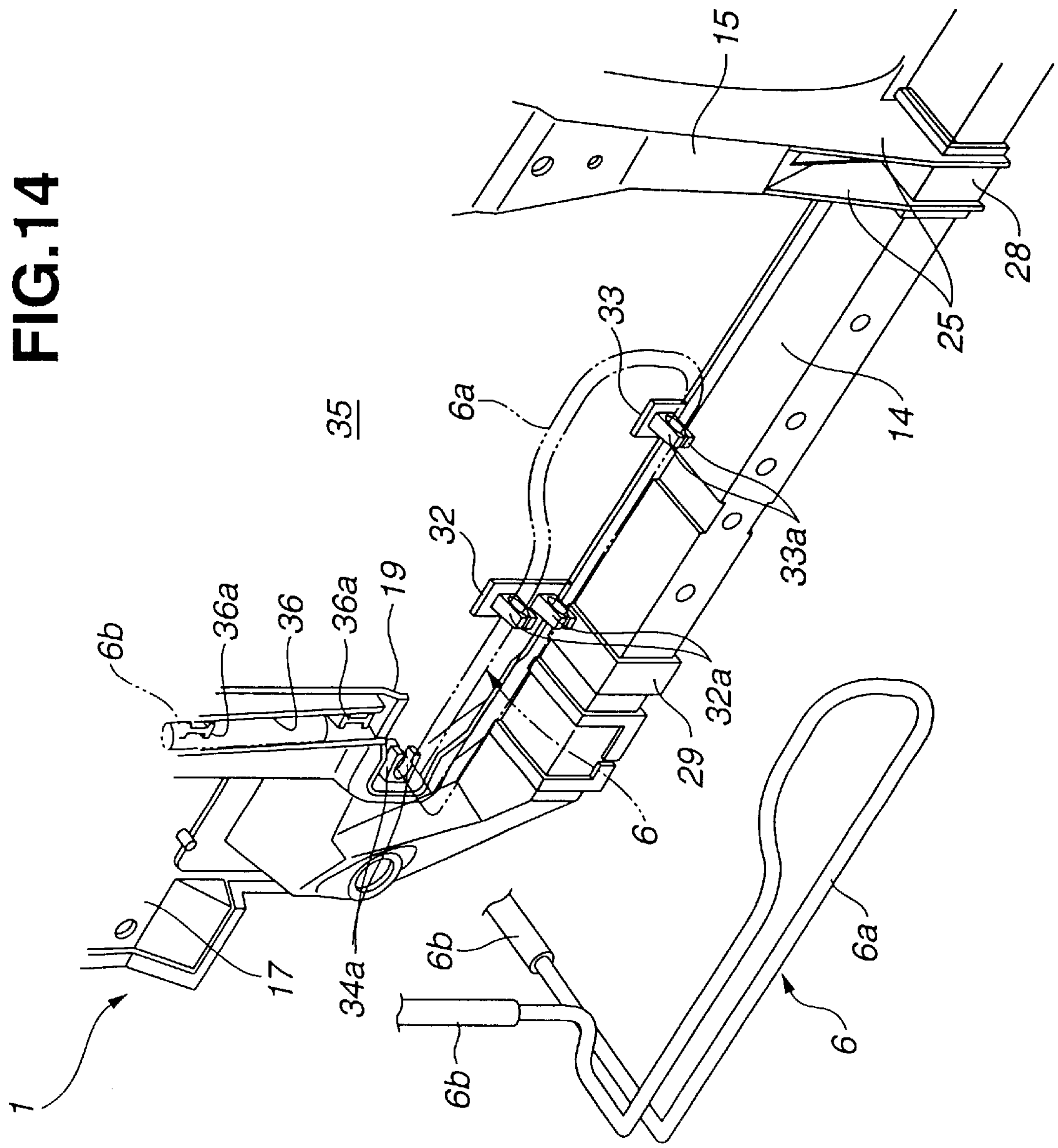
FIG. 14 is a perspective front view of a part of the radiator core support structure, showing a holder arrangement incorporated with the lower elongate member for holding an oil tube extending from a power steering unit.

Referring to FIG. 14, there is shown a tube holding arrangement which is arranged on the lower elongate member 14 to hold an oil tube 6 extending from the power steering unit (not shown). The tube holding arrangement comprises the brackets 32, 33 and 34 which are mounted on the lower elongate member 14 to hold a heat radiation part 6*a* of the oil tube 6 and a vertically groove 36 defined by the pillar portion 19. As shown by the phantom line, upon installation, the heat radiation part 6*a*of the oil tube 6 is exposed to one of the radiator openings 35 of the radiator core support structure 1.

The bracket 32 extends vertically from the grip plastic portion 29 that grips the lower elongate member 14, the bracket 33 extends vertically from the zigzag ribs 22 in the lower elongate member 14 and the bracket 34 is integral with the lower end of the pillar portion 19. As is seen from the drawing, the bracket 32 has a lower end integrated with the zigzag ribs 22 in the lower elongate member 14.

Each of the brackets 32, 33 and 34 is integrally formed with paired, viz., upper and lower holding pawls 32*a*, 33*a* or 34*a* through which the heat radiation part 6*a* of the oil tube 6 is detachably but resiliently held. With usage of these holding pawls 32*a*, 33*a* and 34*a*, the oil tube 6 of the steering power unit is assuredly and reliably held by the brackets 32, 33 and 34.

The pillar portion 19 is formed with the vertically extending groove 36 by which a non-radiation part 6*b* of the oil tube 6 is steadily held. For assuring a heat insulation between the oil tube 6 and the pillar portion 19, projections 36*a* are formed on an inner surface of the groove 36, on which the non-radiation part 6*b* of the oil tube 6 is put.

As is described hereinabove, before the radiator core support structure 1 is mounted to the front structure 2 of the vehicle body, the various parts 3, 4, 5, 6, 7, 8 and 9 (see FIG. 2) are mounted to the structure 1 to constitute a part carrier module. Then, as will be seen from FIG. 1, the module (1) is brought to the front structure 2 of the vehicle body. Then, the side members 17 of the radiator core support structure 1 are tightly connected to the front ends of the front side members 10 of the front structure 2 of the vehicle body and then opposed ends of the upper elongate member 13 are tightly connected to front ends of the hood ridge panels 11.

As is described hereinabove, in the radiator core support structure 1 of the present invention, each of the two vertical walls 25 (see FIGS. 3, 6 and 8) of the hood lock stay portion 15 of molded plastic has a generally U-shaped grip portion 28 which tightly grips the lower elongate member 14. Furthermore, the upper end of the hood lock stay portion 15 is integrated with the hood lock mounting member 16 which is welded to the upper elongate member 13. That is, the hood lock mounting member 16 is connected to the lower elongate member 14 through the hood lock stay portion 15 of molded plastic which is tightly connected to both the upper and lower elongate members 13 and 14 in the above-mentioned manner. Thus, even when the engine hood is strongly abutted against the hood lock device on the hood lock mounting member 16, the hood lock stay portion 15 can bear a marked shock applied thereto. Furthermore, even when an associated motor vehicle is subjected to a head-on collision or side collision, the hood lock stay portion 15 can bear the marked tensile load applied thereto.

Furthermore, in the present invention, the radiator core support structure 1 is provided at a back side thereof with the bracket arrangement through which the radiator 8 is resiliently and reliably supported. That is, the radiator 8 and the radiator core support structure 1 constitute a so-called dynamic damper system together with the rubber mounts 38 and 41 disposed therebetween. With this damper system, undesired noise (low frequency noise) in the passenger cabin and undesired vibration of a steering wheel, which would be produced when the engine is idling, can be minimized. Because the lower brackets 36 have a higher spring constant than the rubber mounts 38, the bracket arrangement can exhibit a satisfied dynamic damping effect. Furthermore, for the same reason, tuning of the dynamic damper is easily made.

Furthermore, in the present invention, the radiator core support structure 1 is provided at the radiator opening 35 thereof with the tube holder arrangement for holding the oil tube 6 of the power steering unit, which comprises the brackets 32, 33 and 34 made of molded plastic and the groove 36 of the pillar portion 19 made of molded plastic. Thus, even when the oil tube 6 is forced to vibrate due to pressure fluctuation of oil in the oil tube 6, the vibration is effectively damped by the brackets 32, 33 and 34 and the pillar portion 19. Since the parts 32, 33, 34 and 19 of the tube holding arrangement are integrally molded with the zigzag rubs 22 upon molding, there is no need of employing separate holders for holding the oil tube 6, which reduces the number of parts of the radiator core support structure 1.

Besides the above-mentioned advantages, the radiator core support structure 1 of the present invention has various advantages which are as follows.

The radiator core support structure 1 of the present invention comprises the metal-made parts and plastic-made portions which are integrally connected to one another at the time of injection molding, and thus the radiator core support structure 1 has a robust construction as well as a satisfied dimensional stability. The torsional distortion and dimensional error of the radiator core support structure 1 of the invention are suppressed or at least minimized, which facilitates mounting of the radiator core support structure 1 to the front structure 2 of the vehicle body.

Since the hood lock stay portion 15 is tightly connected to the upper and lower elongate members 13 and 14 in the above-mentioned manner, the stay portion 15 can satisfactorily bear the shock which would be applied thereto when the engine hood is bumped against the hood lock mechanism on the hood lock mounting member 16. Furthermore, stay portion 15 can bear the marked tensile load which would be applied thereto upon a vehicle collision, which keeps the locked engagement between the hood lock device and the engine hood.

Although the invention has been described above with reference to the embodiments of the invention, the invention is not limited to such embodiments as described above. Various modifications and variations of such embodiments may be carried out by those skilled in the art, in light of the above description.

What is claimed is:

1. A radiator core support structure comprising:

an upper elongate member;

a lower elongate member made of metal; and a hood lock stay portion made of integrally molded plastic, said hood lock stay portion having an upper end integrally connected to said upper elongate member and a lower end that is integrally connected to and shaped to grip an intermediate portion of said lower elongate member, the connection between the hood lock stay portion and said lower elongate member being integrally carried out by injection molding.

2. A radiator core support structure as claimed in claim 1, in which said upper end of said hood lock stay portion is connected to an intermediate portion of said upper elongate member and said lower end of said hood lock stay portion is connected to an intermediate portion of said lower elongate member.

3. A radiator core support structure as claimed in claim 2, in which said hood lock stay portion is constructed to have a generally C-shaped cross section, which comprises an elongate front wall and two elongate side walls which are combined to constitute a channel structure.

4. A radiator core support structure as claimed in claim 3, in which said lower end of the hood lock stay portion comprises:

a depressed part defined by said hood lock stay portion; and two vertical walls which are arranged to sandwich therebetween said depressed part and reinforce said depressed part, each vertical wall extending in an axial direction of said hood lock stay portion.

5. A radiator core support structure as claimed in claim 4, in which each of said two vertical walls has a generally U-shaped grip portion which tightly grips said lower elongate member.

6. A radiator core support structure as claimed in claim 5, in which said U-shaped grip portion of each vertical wall is constructed to substantially surround the intermediate portion of said lower elongate member.

7. A radiator core support structure as claimed in claim 5, in which said lower elongate member is of a channel member, in which a reinforcing structure of integrally molded plastic is installed in the channel of the lower elongate member to reinforce the lower elongate member, and in which each of the vertical walls of the lower end of said hood lock stay portion has a rear end integral with the reinforcing structure in the channel of the lower elongate member.

8. A radiator core support structure as claimed in claim 7, in which the intermediate portion of said lower elongate member is formed with at least one through hole through which a front wall part of the lower end of said hood lock stay portion is integrally connected with the reinforcing structure of the molded plastic which is installed in said lower elongate member.

9. A radiator core support structure as claimed in claim 8, in which the reinforcing structure comprises a plurality of alternately slanted ribs which run in a zigzag line.

10. A radiator core support structure as claimed in claim 1, in which said upper and lower elongate members are of a channel member and said upper elongate member is made of metal.

11. A radiator core support structure as claimed in claim 10, further comprising a hood lock mounting member made of metal, said hood lock mounting member being welded to an intermediate portion of said upper elongate member of metal and integrally connected to said upper end of said hood lock stay portion.

12. A radiator core support structure as claimed in claim 11, in which a reinforcing structure of integrally molded plastic is installed in each of the channels of the upper and lower elongate members to reinforce the upper and lower elongate members.

13. A radiator core support structure as claimed in claim 12, in which the reinforcing structure in each of the upper and lower elongate members comprises a plurality of alternately slanted ribs which run in a zigzag line.

14. A radiator core support structure as claimed in claim 13, in which said hood lock mounting member of metal has a bent lower end which is embedded in said hood lock stay portion.

15. A radiator core support structure as claimed in claim 14, further comprising two pillar portions made of integrally molded plastic, each having an upper end integrally connected to a laterally outside end of said upper elongate member and a lower end integrally connected to a laterally outside end of said lower elongate member.

16. A radiator core support structure as claimed in claim 15, further comprising two side members of metal, each side member being welded to the laterally outside end of said lower elongate member and connected to one of the two pillar portions.

17. A radiator core support structure as claimed in claim 16, further comprising two lamp mounting portions made of integrally molded plastic, each lamp mounting portion being interposed between the laterally outside end portion of said upper elongate member and one of the side members of metal.

18. A radiator core support structure as claimed in claim 12, further comprising a bracket arrangement through which a radiator is held on a back side of the radiator core support structure.

19. A radiator core support structure as claimed in claim 18, in which said bracket arrangement comprises laterally spaced lower brackets integrated with the reinforcing structure installed in the channel of the lower elongate member, said lower brackets being projected backward from said lower elongate member to support thereon a lower portion of said radiator.

20. A radiator core support structure as claimed in claim 19, in which each of said laterally spaced lower brackets is constructed to have a generally H-shape.

21. A radiator core support structure as claimed in claim 20, in which said laterally spaced lower brackets comprise:

a horizontal base wall which has a circular opening; and two triangular upper ribs which extend upward from laterally opposed ends of said flat base wall.

22. A radiator core support structure as claimed in claim 21, in which said laterally spaced lower brackets further comprise two lower ribs which extend downward from the laterally opposed ends of the flat base wall.

23. A radiator core support structure as claimed in claim 22, in which said laterally spaced lower brackets further comprise two front lower ribs which extend forward from front ends of the lower ribs.

24. A radiator core support structure as claimed in claim 23, in which said laterally spaced lower brackets are integrated with a grip plastic portion which grips a given part of said lower elongate member, said grip plastic portion being integrated with the reinforcing structure installed in said lower elongate member.

25. A radiator core support structure as claimed in claim 19, in which said bracket arrangement further comprises laterally spaced upper brackets made of metal and secured to said upper elongate member, said upper brackets being projected backward from said upper elongate member to connect an upper portion of said radiator.

26. A radiator core support structure as claimed in claim 12, further comprising a tube holder arrangement which holds an oil tube extending from a power steering unit on the lower elongate member.

27. A radiator core support structure as claimed in claim 26, in which said tube holder arrangement comprises at least one bracket which is raised from the lower elongate member and integral with the reinforcing structure installed in the lower elongate member, said bracket including two holding pawls by which a part of said oil tube is detachably held.

28. A radiator core support structure as claimed in claim 27, in which said bracket is integral with a grip portion of molded plastic which grips a part of said lower elongate member.

29. A radiator core support structure as claimed in claim 28, further comprising another bracket which is integral with a pillar portion of molded plastic which extends between the upper and lower elongate members, said another bracket including two holding pawls by which a part of said oil tube is detachably held.

30. A radiator core support structure as claimed in claim 29, in which said pillar portion is formed with a vertically extending groove in which another part of said oil tube is steadily received.

31. A radiator core support structure comprising:

an upper elongate member made of metal;

a hood lock mounting member made of metal, said hood lock mounting member being welded to an intermediate portion of said upper elongate member;

a lower elongate member made of metal;

two side members made of metal, said side members being welded to laterally opposed ends of said lower elongate member;

a hood lock stay portion made of a molded plastic, said hood lock stay portion having an upper end integrally connected to said hood lock mounting member and a lower end integrally connected to an intermediate portion of said lower elongate member;

two pillar portions made of molded plastic, each pillar portion extending between laterally outside portions of said upper and lower elongate members;

an upper reinforcing structure made of molded plastic, said upper reinforcing structure extending in a channel defined in said upper elongate member and integrally connected with the upper end of said hood lock stay portion as well as the upper ends of said two pillar portions; and a lower reinforcing structure made of molded plastic, said lower reinforcing structure extending in a channel defined in said lower elongate member and integrally connected with the lower end of said hood lock stay portion as well as the lower ends of said two pillar portions, wherein the lower end of said hood lock stay portion is shaped to grip the intermediate portion of said lower elongate member.

32. A radiator core support structure comprising:

an upper elongate member made of metal;

a hood lock mounting member made of metal, said hood lock mounting member being welded to an intermediate portion of said upper elongate member;

a lower elongate member made of metal;

two side members made of metal, said side members being welded to laterally opposed ends of said lower elongate member;

a hood lock stay portion made of a molded plastic, said hood lock stay portion having an upper end integrally connected to said hood lock mounting member and a lower end integrally connected to an intermediate portion of said lower elongate member;

two pillar portions made of molded plastic, each pillar portion extending between laterally outside portions of said upper and lower elongate members;

an upper reinforcing structure made of molded plastic, said upper reinforcing structure extending in a channel defined in said upper elongate member and integrally connected with the upper end of said hood lock stay portion as well as the upper ends of said two pillar portions;

a lower reinforcing structure made of molded plastic, said lower reinforcing structure extending in a channel defined in said lower elongate member and integrally connected with the lower end of said hood lock stay portion as well as the lower ends of said two pillar portions;

mutually spaced two lower brackets which are integral with the lower reinforcing structure and exposed to a back side of said lower elongate member; and mutually spaced two upper brackets made of metal, said upper brackets being secured to said upper elongate member and exposed to a back side of said upper elongate member, wherein said lower and upper brackets are arranged to support and hold a radiator.

33. A radiator core support structure comprising:

an upper elongate member made of metal;

a hood lock mounting member made of metal, said hood lock mounting member being welded to an intermediate portion of said upper elongate member;

a lower elongate member made of metal;

two side members made of metal, said side members being welded to laterally opposed ends of said lower elongate member;

a hood lock stay portion made of a molded plastic, said hood lock stay portion having an upper end integrally connected to said hood lock mounting member and a lower end integrally connected to an intermediate portion of said lower elongate member;

two pillar portions made of molded plastic, each pillar portion extending between laterally outside portions of said upper and lower elongate members;

an upper reinforcing structure made of molded plastic, said upper reinforcing structure extending in a channel defined in said upper elongate member and integrally connected with the upper end of said hood lock stay portion as well as the upper ends of said two pillar portions;

a lower reinforcing structure made of molded plastic, said lower reinforcing structure extending in a channel defined in said lower elongate member and integrally connected with the lower end of said hood lock stay portion as well as the lower ends of said two pillar portions;

first and second brackets which are integral with the lower reinforcing structure and raised from the lower elongate member, each bracket including two holding pawls by which an oil tube from a power steering unit is detachably held;

a third bracket integral with one of said pillar portions, said third bracket including two holding pawls by which said oil tube is detachably held; and a vertically extending groove defined by the pillar portion, said groove steadily receiving therein a part of said oil tube.

* * * * *